(12) United States Patent
Kushwah et al.

(10) Patent No.: US 8,260,753 B2
(45) Date of Patent: Sep. 4, 2012

(54) BACKUP INFORMATION MANAGEMENT

(75) Inventors: Ajay Pratap Singh Kushwah, San Ramon, CA (US); Akhil Kaushik, Sunnyvale, CA (US); Jian Xing, Antioch, CA (US); Mayank Joshi, Santa Clara, CA (US); Pashupati Kumar, San Jose, CA (US); Subramaniam Periyagaram, Sunnyvale, CA (US); Rangarajan Suryanarayanan, Santa Clara, CA (US); Yogita Bijani, Santa Clara, CA (US)

(73) Assignee: EMC Corporation, Hopkinton, MA (US)

(*) Notice: Subject to any disclaimer, the term of this patent is extended or adjusted under 35 U.S.C. 154(b) by 1246 days.

(21) Appl. No.: 11/084,179

(22) Filed: Mar. 18, 2005

(65) Prior Publication Data
US 2006/0149793 A1 Jul. 6, 2006

Related U.S. Application Data

(60) Provisional application No. 60/640,971, filed on Dec. 31, 2004.

(51) Int. Cl.
*G07F 17/30* (2006.01)
(52) U.S. Cl. .................. 707/654; 711/163; 711/164
(58) Field of Classification Search .................. 707/654; 711/163–164
See application file for complete search history.

(56) References Cited

U.S. PATENT DOCUMENTS

| 5,233,513 | A | * | 8/1993 | Doyle ........................... 705/7 |
| 5,287,496 | A | | 2/1994 | Chen et al. |
| 5,303,042 | A | * | 4/1994 | Lewis et al. ............... 348/14.01 |
| 5,371,851 | A | * | 12/1994 | Pieper et al. .................. 345/501 |
| 5,403,639 | A | | 4/1995 | Belsan et al. |
| 5,481,701 | A | | 1/1996 | Chambers, IV |
| 5,625,818 | A | * | 4/1997 | Zarmer et al. ............. 707/104.1 |
| 5,627,974 | A | * | 5/1997 | Watts et al. ................... 710/304 |
| 5,675,510 | A | | 10/1997 | Coffey et al. |
| 5,684,991 | A | | 11/1997 | Malcolm |
| 5,761,680 | A | * | 6/1998 | Cohen et al. ..................... 1/1 |
| 5,905,988 | A | | 5/1999 | Schwartz et al. |
| 6,021,437 | A | | 2/2000 | Chen et al. |
| 6,052,780 | A | * | 4/2000 | Glover ........................ 713/193 |
| 6,141,686 | A | | 10/2000 | Jackowski et al. |
| 6,173,325 | B1 | | 1/2001 | Kukreja |
| 6,185,686 | B1 | * | 2/2001 | Glover ........................ 713/190 |
| 6,212,512 | B1 | | 4/2001 | Barney et al. |
| 6,223,343 | B1 | * | 4/2001 | Hopwood et al. ........... 717/101 |
| 6,256,773 | B1 | * | 7/2001 | Bowman-Amuah ......... 717/121 |

(Continued)

FOREIGN PATENT DOCUMENTS
WO WO 2004/047078 6/2004

OTHER PUBLICATIONS

U.S. Appl. No. 60/640,971, filed Dec. 31, 2004, Kushwah et al.

(Continued)

*Primary Examiner* — Mark Andrew X Radtke
(74) *Attorney, Agent, or Firm* — Van Pelt, Yi & James LLP

(57) ABSTRACT

In one embodiment, a method for information management comprises monitoring output from an application, wherein the output is monitored substantially continuously; determining if the output is associated with a predetermined type of version; and saving data associated with the output if the output is associated with the predetermined type of version.

21 Claims, 17 Drawing Sheets

U.S. PATENT DOCUMENTS

| | | | |
|---|---|---|---|
| 6,324,581 B1* | 11/2001 | Xu et al. | 709/229 |
| 6,351,847 B1 | 2/2002 | Sakamoto et al. | |
| 6,397,379 B1* | 5/2002 | Yates et al. | 717/140 |
| 6,405,049 B2* | 6/2002 | Herrod et al. | 455/517 |
| 6,415,300 B1 | 7/2002 | Liu | |
| 6,434,680 B2 | 8/2002 | Belknap et al. | |
| 6,453,343 B1 | 9/2002 | Housel et al. | |
| 6,453,354 B1* | 9/2002 | Jiang et al. | 709/229 |
| 6,460,055 B1 | 10/2002 | Midgley et al. | |
| 6,549,959 B1* | 4/2003 | Yates et al. | 710/22 |
| 6,549,992 B1 | 4/2003 | Armangau et al. | |
| 6,591,377 B1 | 7/2003 | Evoy | |
| 6,606,694 B2 | 8/2003 | Carteau | |
| 6,658,465 B1* | 12/2003 | Touboul | 709/223 |
| 6,751,604 B2 | 6/2004 | Barney et al. | |
| 6,763,452 B1* | 7/2004 | Hohensee et al. | 712/227 |
| 6,769,071 B1 | 7/2004 | Cheng et al. | |
| 6,779,107 B1* | 8/2004 | Yates | 712/229 |
| 6,789,181 B1* | 9/2004 | Yates et al. | 712/4 |
| 6,802,025 B1 | 10/2004 | Thomas et al. | |
| 6,839,721 B2 | 1/2005 | Schwols | |
| 6,845,486 B2* | 1/2005 | Yamada et al. | 715/706 |
| 6,861,951 B2* | 3/2005 | Reghetti et al. | 340/506 |
| 6,868,495 B1* | 3/2005 | Glover | 713/190 |
| 6,934,832 B1* | 8/2005 | Van Dyke et al. | 712/244 |
| 6,941,545 B1* | 9/2005 | Reese et al. | 717/130 |
| 6,954,923 B1* | 10/2005 | Yates et al. | 717/130 |
| 6,973,455 B1* | 12/2005 | Vahalia et al. | 1/1 |
| 6,978,462 B1* | 12/2005 | Adler et al. | 719/318 |
| 6,983,287 B1 | 1/2006 | Jayanti et al. | |
| 6,983,317 B1* | 1/2006 | Bishop et al. | 709/223 |
| 7,013,456 B1* | 3/2006 | Van Dyke et al. | 717/130 |
| 7,043,485 B2 | 5/2006 | Manley et al. | |
| 7,047,250 B1 | 5/2006 | Agarwal et al. | |
| 7,051,053 B2* | 5/2006 | Sinha | 1/1 |
| 7,065,633 B1* | 6/2006 | Yates et al. | 712/227 |
| 7,069,277 B2* | 6/2006 | Okada et al. | 707/203 |
| 7,069,421 B1* | 6/2006 | Yates et al. | 712/209 |
| 7,096,264 B2 | 8/2006 | Bonney et al. | |
| 7,111,290 B1* | 9/2006 | Yates et al. | 717/158 |
| 7,113,934 B2* | 9/2006 | Levesque et al. | 707/1 |
| 7,120,631 B1* | 10/2006 | Vahalia et al. | 1/1 |
| 7,165,079 B1 | 1/2007 | Chen et al. | |
| 7,194,623 B1* | 3/2007 | Proudler et al. | 713/164 |
| 7,197,520 B1 | 3/2007 | Matthews et al. | |
| 7,200,616 B2 | 4/2007 | Takeuchi et al. | |
| 7,203,711 B2 | 4/2007 | Borden et al. | |
| 7,225,208 B2 | 5/2007 | Midgley et al. | |
| 7,237,075 B2 | 6/2007 | Welsh et al. | |
| 7,257,606 B2 | 8/2007 | Kapoor et al. | |
| 7,305,529 B1 | 12/2007 | Kekre et al. | |
| 7,318,093 B2* | 1/2008 | Touboul | 709/223 |
| 7,328,260 B1 | 2/2008 | Muthiyan et al. | |
| 7,330,997 B1 | 2/2008 | Odom | |
| 7,409,644 B2* | 8/2008 | Moore et al. | 715/774 |
| 7,487,493 B1* | 2/2009 | Faulkner | 717/105 |
| 7,529,782 B2 | 5/2009 | Prahlad et al. | |
| 7,609,829 B2* | 10/2009 | Wang et al. | 379/201.01 |
| 7,643,998 B2* | 1/2010 | Yuen et al. | 704/275 |
| 7,661,135 B2 | 2/2010 | Byrd et al. | |
| 7,664,750 B2* | 2/2010 | Frees et al. | 709/205 |
| 2001/0047368 A1 | 11/2001 | Oshinsky et al. | |
| 2002/0021869 A1 | 2/2002 | Griffin | |
| 2002/0032754 A1 | 3/2002 | Logston et al. | |
| 2002/0046275 A1 | 4/2002 | Crosbie et al. | |
| 2002/0083037 A1* | 6/2002 | Lewis et al. | 707/1 |
| 2002/0083053 A1 | 6/2002 | Richard et al. | |
| 2002/0107877 A1 | 8/2002 | Whiting et al. | |
| 2002/0145742 A1* | 10/2002 | Koenig et al. | 358/1.1 |
| 2002/0188590 A1 | 12/2002 | Curran et al. | |
| 2003/0046313 A1 | 3/2003 | Leung et al. | |
| 2003/0088536 A1* | 5/2003 | Behnia | 707/1 |
| 2003/0093709 A1 | 5/2003 | Ogawa et al. | |
| 2003/0120818 A1 | 6/2003 | Ho | |
| 2003/0131098 A1 | 7/2003 | Huntington et al. | |
| 2003/0135703 A1 | 7/2003 | Martin et al. | |
| 2003/0140204 A1 | 7/2003 | Ashton et al. | |
| 2003/0159007 A1 | 8/2003 | Sawdon et al. | |
| 2003/0182301 A1 | 9/2003 | Patterson et al. | |
| 2004/0010487 A1 | 1/2004 | Prahlad et al. | |
| 2004/0064488 A1* | 4/2004 | Sinha | 707/204 |
| 2004/0078630 A1 | 4/2004 | Niles et al. | |
| 2004/0088334 A1 | 5/2004 | Klein | |
| 2004/0133602 A1 | 7/2004 | Kusters et al. | |
| 2004/0181691 A1 | 9/2004 | Armingaud et al. | |
| 2004/0199626 A1 | 10/2004 | Nuggehalli | |
| 2004/0230737 A1 | 11/2004 | Burton et al. | |
| 2004/0246123 A1 | 12/2004 | Kawabe et al. | |
| 2004/0261070 A1 | 12/2004 | Miller et al. | |
| 2004/0267836 A1 | 12/2004 | Armangau et al. | |
| 2005/0021565 A1 | 1/2005 | Kapoor et al. | |
| 2005/0021869 A1 | 1/2005 | Aultman et al. | |
| 2005/0027702 A1 | 2/2005 | Jensen et al. | |
| 2005/0055328 A1 | 3/2005 | Yagawa | |
| 2005/0065986 A1 | 3/2005 | Bixby et al. | |
| 2005/0086241 A1 | 4/2005 | Ram et al. | |
| 2005/0086342 A1 | 4/2005 | Burt et al. | |
| 2005/0120242 A1 | 6/2005 | Mayer et al. | |
| 2005/0131990 A1 | 6/2005 | Jewell | |
| 2005/0166082 A1 | 7/2005 | Williams et al. | |
| 2005/0187992 A1 | 8/2005 | Prahlad et al. | |
| 2005/0228832 A1 | 10/2005 | Ghotge et al. | |
| 2005/0278393 A1 | 12/2005 | Huras et al. | |
| 2005/0283567 A1 | 12/2005 | Popescu-Stanesti et al. | |
| 2006/0029038 A1 | 2/2006 | Jungck | |
| 2006/0031468 A1 | 2/2006 | Atluri et al. | |
| 2006/0112151 A1 | 5/2006 | Manley et al. | |
| 2006/0225065 A1 | 10/2006 | Chandhok et al. | |
| 2006/0282439 A1 | 12/2006 | Allen et al. | |
| 2007/0061505 A1* | 3/2007 | Deng et al. | 711/103 |
| 2007/0136463 A1 | 6/2007 | Guenther et al. | |

OTHER PUBLICATIONS

U.S. Appl. No. 11/084,179, filed Mar. 18, 2005, Kushwah et al.
U.S. Appl. No. 11/084,065, filed Mar. 18, 2005, Kushwah et al.
U.S. Appl. No. 11/084,679, filed Mar. 18, 2005, Kushwah et al.
U.S. Appl. No. 11/084,066, filed Mar. 18, 2005, Kushwah et al.
U.S. Appl. No. 11/084,067, filed Mar. 18, 2005, Kushwah et al.
Author Unknown, FAST Data Search™ Product Line, Version 4.0.
Author Unknown, FAST Data Search, the Enterprise Search Solution, http://www.fastsearch.com/us/products/fast_data_search.
Google, Google Enterprise Solutions, Google search for your business, http://www.google.com/enterprise/.
Google, Google Enterprise Solutions: Google Search Appliance.
Peter J. Varman & Rakesh M. Verma, An Efficient Multiversion Access Structure, May/Jun. 1997, IEEE Transactions on Knowledge and Data Engineering, vol. 9, No. 3.
Berners-Lee et al., "Uniform Resource Identifier (URI): Generic Syntax," Standards Track, Jan. 2005, Network Working Group.
Levy et al., "Incremental Recovery in Main Memory Database Systems", IEEE vol. 4, Dec. 1992, pp. 529-540.
Shrira et al., "SNAP: Efficient snapshots for back-in-time execution", IEEE, Apr. 5-8, 2005, pp. 434-445.
Varman et al., "An Efficient Multiversion Access Structure", 1997, IEEE, vol. 9, 391-409.
Zhiwei et al., "Efficient data restoration for a disk-based network backup system", Mechatronics, 2004. ICM '04 Proceedings of the IEEE International Conference in Istanbul, Turkey, Jun. 3-5, 2004.

* cited by examiner

BACKUP INFORMATION MANAGEMENT

CROSS REFERENCE TO OTHER APPLICATIONS

This application claims priority to U.S. Provisional Patent Application No. 60/640,971 entitled INFORMATION PROTECTION AND MANAGEMENT filed Dec. 31, 2004, which is incorporated herein by reference for all purposes.

FIELD OF THE INVENTION

The present invention relates generally to electronic information, more specifically to information management.

BACKGROUND OF THE INVENTION

Computer backup and recovery tools are typically used by scheduling a set number of backups, such as one backup per day. A potential problem with the traditional backup system is that if a user needs to recover data, the data that was created after the last backup will typically be lost. It would be desirable to efficiently protect and manage information so that the information can be recovered even in between scheduled backups.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
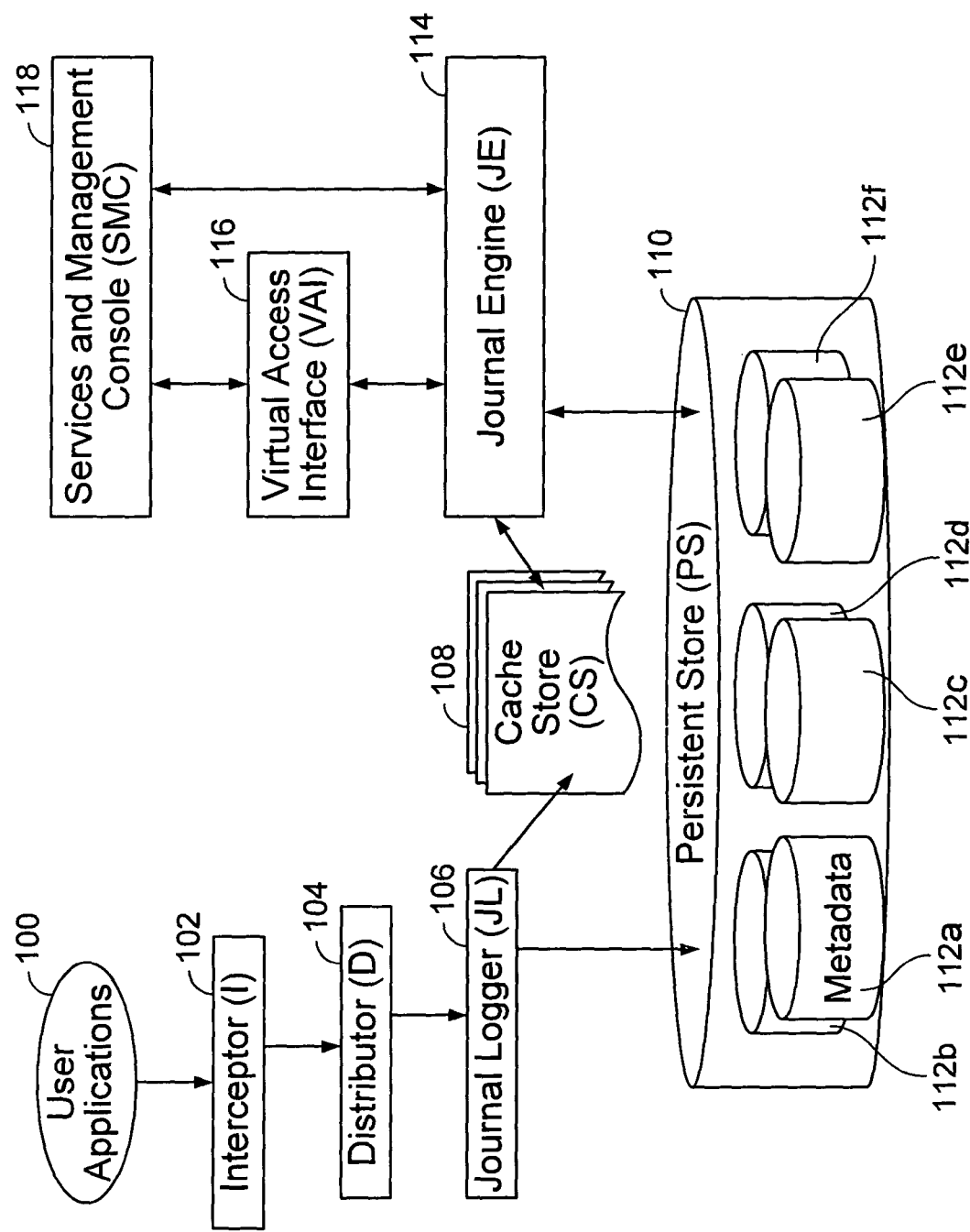
FIG. 1 is a block diagram of components for information protection and management in some embodiments.
Figure 2:
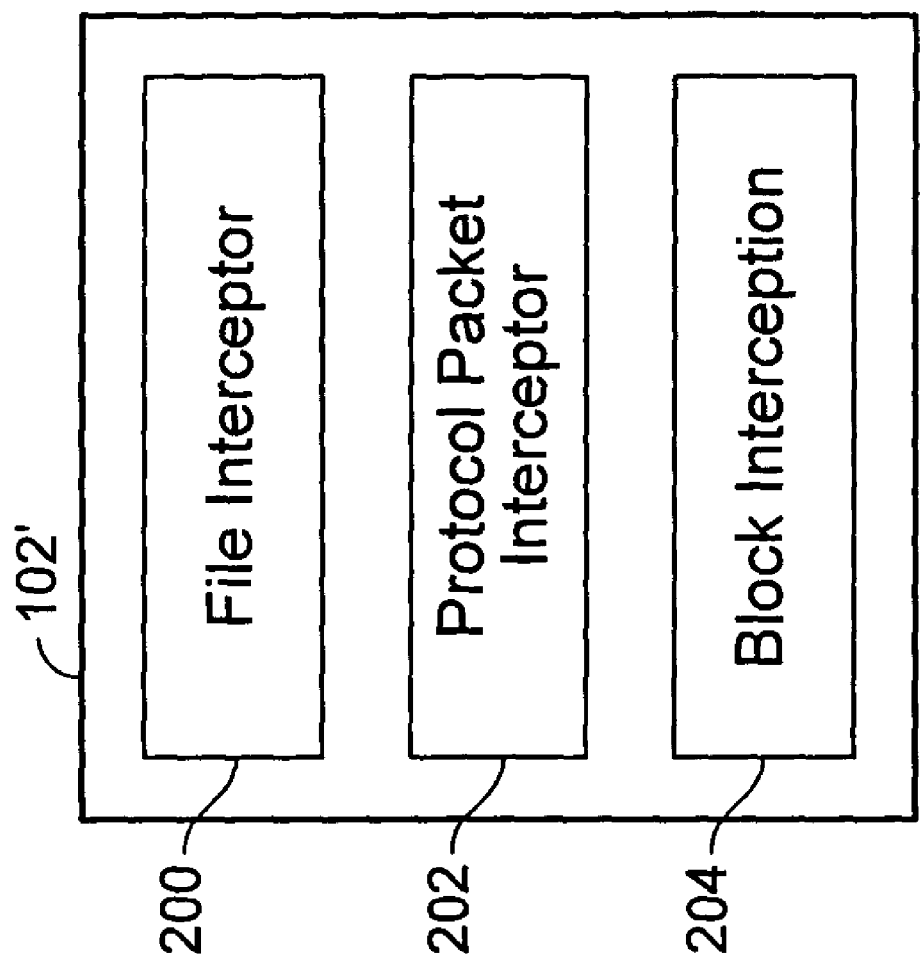
FIG. 2 is a block diagram of an interceptor in some embodiments.
Figure 3:
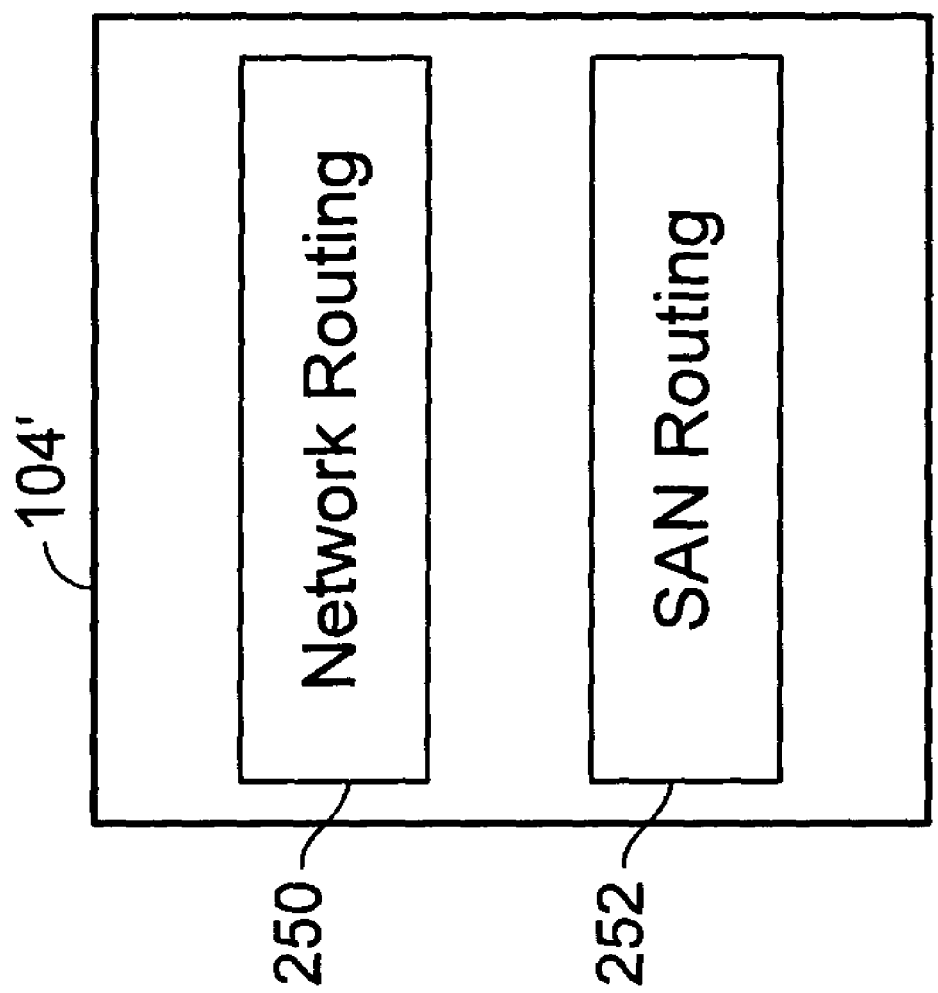
FIG. 3 shows an example of the routing components that may be included in a distributor in some embodiments.

FIG. 1 is a block diagram of components for information protection and management in some embodiments. FIG. 1 can be better understood when discussed in conjunction with FIGS. 2 and 3. FIG. 2 is a block diagram of an interceptor in some embodiments. FIG. 3 shows an example of the routing components that may be included in a distributor in some embodiments.

In the example shown in FIG. 1, user applications 100 are monitored by an interceptor 102. Examples of user applications include file systems, databases, and applications such as financial or word processing. All applications may be selected to be monitored by the interceptor 102 or a subset of the applications may be selected to be monitored. The interceptor may intercept input/output (I/O) from the application to the operating system. In some embodiments the interceptor 102 continuously monitors I/Os from the application.

In some embodiments, if interceptor 102 resides on a host machine, the information may be captured before writing to storage. If interceptor 102 resides in a SAN, then the information can be captured when the operating system is about to write to storage. If interceptor 102 is in a NAS or on a TCP/IP switch, then the TCP/IP packets may be intercepted.

In the example shown in FIG. 2, interceptor 102' is shown to include a file interceptor 200, a protocol packet interceptor 202, and a block interceptor 204. In some embodiments only one of these interceptor components 200-204 are included in interceptor 102'. In some embodiments, two or more of these interceptor components 200-204 are included in interceptor 102'.

In one embodiment, interceptor 102' resides on a host machine and uses the file interceptor which may trap file I/O and generate meta-info on the file I/Os. In another embodiment, the interceptor 102' resides in a NAS and uses the protocol packet interceptor which traps packets such as NFS, CIFS, or iSCSI packets in an IP platform. In another embodiment, the interceptor 102' resides either in a SAN or on a host machine and uses a block interceptor which may intercept changes to data blocks. Further details of using the file interceptor 200 and block interceptor 204 will later be discussed in conjunction with FIG. 12.

Returning to FIG. 1, the interceptor 102 may generate meta-information packets herein referred to as a milestone marker, indicating a significant event of the information. Meta-information, as used herein, includes information about information. Examples of events that might trigger a milestone marker include the creation of a file, the deletion of a file, and a backup milestone marker. An example of when a backup milestone marker might be used is when backup markers are inserted according to a preset schedule. Another example is when backup milestone markers are used opportunistically, such as when the system is quiet and it may be determined that it is a good point to recover data.

In some embodiments, the interceptor 102 receives the information, puts it into a packet or packets, and passes it to the distributor 104.

The distributor 104 may receive the packets and sends them to the journal logger 106 according various routing schemes. Examples of the different routing schemes that distributor 104 may use include network routing and SAN routing.

In the example shown in FIG. 3, distributor 104' is shown to include a network routing component 250 and a SAN routing component 252. In some embodiments, distributor 104' may include a single routing component, such as network routing 250 or SAN routing 252. In some embodiments, distributor 104' may include more than one routing component such as network routing 250 and SAN routing 252. Examples of protocols that may be used by network routing component 250 include RPC, TCP/IP, and iSCSI. Examples of protocols that may be used by the SAN routing component 252 include SCSCI and fiber channel protocol (FCP).

Returning to FIG. 1, distributor 104 can be either remotely located from interceptor 102 or local to interceptor 102. Accordingly, the information protection and management technique illustrated in FIG. 1 can be applied to any operating system used by the applications 100, as well as being adaptable to any network configuration.

The distributor 104 sends the information to journal logger 106. In some embodiments, the journal logger 106 transforms and normalizes the intercepted packets so that further storage and management of these packets may be independent of the type of interceptor 102 and distributor 104. In some embodiments, the journal logger may transform the received information into meta-information and filter out insignificant information. It may also normalize to a predetermined format using technologies such as XML or XDR. For example, the distributor 104 may send packets in TCP/IP format and the journal logger 106 may transform the TCP/IP packets into a predetermined format such as XML.

The interceptor 102, the distributor 104, and the journal logger 106 may be incorporated into high performing off-the-shelf components such as routers and multi-protocol switches such as those made by Cisco or Brocade.

The information may be stored in the persistent store 110 which is shown to include multiple storage 112A-112F, including a metadata repository 112A. In some embodiments the data is stored in storage 112B-112F while the metadata associated with the data is stored in the metadata repository 112A. The persistent store 110 may be an intelligent persistent store with processing capabilities.

The journal logger 106 may communication with the journal engine 114 using the cache store 108 and/or the persistent store 110.

In some embodiments, the persistent store 110 is an intelligent data storage device that can note and update version information regarding data that is stored and indexing data information such as time and version related to the stored data. The persistent store 110 may also work with virtualized storage such as a virtual LUN. It may also perform as a multi-versioning information system that can work with various implementations such as file system or object store using various technologies. This feature may be accomplished, for example, by adding a pluggable module and layer to support versioning, such as comprehensive versioning file system (CVFS) developed by Carnegie Mellon University, Reiser4 FS, or Versioning FS. Another example of technology that may be used to implement the multi-versioning information system is Multiple Version Access Structure as described in "An Efficient Multiversion Access Structure" by Peter J. Varman, Rakesh M. Verma, IEEE Transactions on Knowledge and Data Engineering, Vol. 9, No. 3, pp. 391-409, May/June 1997. The persistent store 110 can use any storage media such as SATA, ATA, SCSI, and FC discs.

The journal engine 114 may manage the information stored in the persistent store 110. The journal engine 114 may include a query processing engine to respond to user requests. It may also determine and maintain the number of copies of a particular data as well as where those copies are located, and when various versions were created.

The journal engine 114 may also include a policy engine that enforces policy such as enterprise policy or SEC compliance policy. For example, the journal engine 114 may manage how many versions of data may be stored, when to move the data to another storage device, how many copies of a particular document to retain, etc. It may also maintain original data source information such as what program created the data and its various properties, such as who created it, when it was created, and its size, as well as storage entities associated with the data, and storage stack schema such as file system, volume manager, or LUNS. The journal engine 114 may also manage milestone markers by, for example, posting markers in persistent storage, and determining what the milestone markers mean. For example, a milestone marker may indicate that it is a good point to backup, or it may indicate a meaningful version. The journal engine 114 may also maintain metadata information. Examples of such metadata information include information such as two copies having been made of a particular document and one of them having been deleted and at what time and by whom.

The journal engine 114 may also manage journal compaction for storage optimization as well as managing encryption of particular data. The journal engine 114 may also manage virtual snapshots to allow a user to view data at any point in time. The virtual snapshot options can be presented in various forms such as an NFS, CIFS file system, or as a LUN. For example, if a user requests to see D drive as it was at 2:00 p.m., the journal engine 114 may construct the complete set of data for D drive at 2:00 p.m. from persistent storage 110, and if necessary, from various secondary storage devices if data has been moved to these devices for optimization purposes. Further details of the journal engine 114 will be discussed later in conjunction with the remaining figures.

The virtual access interface 116 may present requested information to a user in various forms, such as LUN, file system, or network file system, or application objects. The virtual access interface 116 may work in conjunction with services and management console 118 which may function as a user interface, such as a graphical user interface, to allow a user to set policies, configuration, query selection, and general interface with the user for browsing and recovery.

Figure 4:
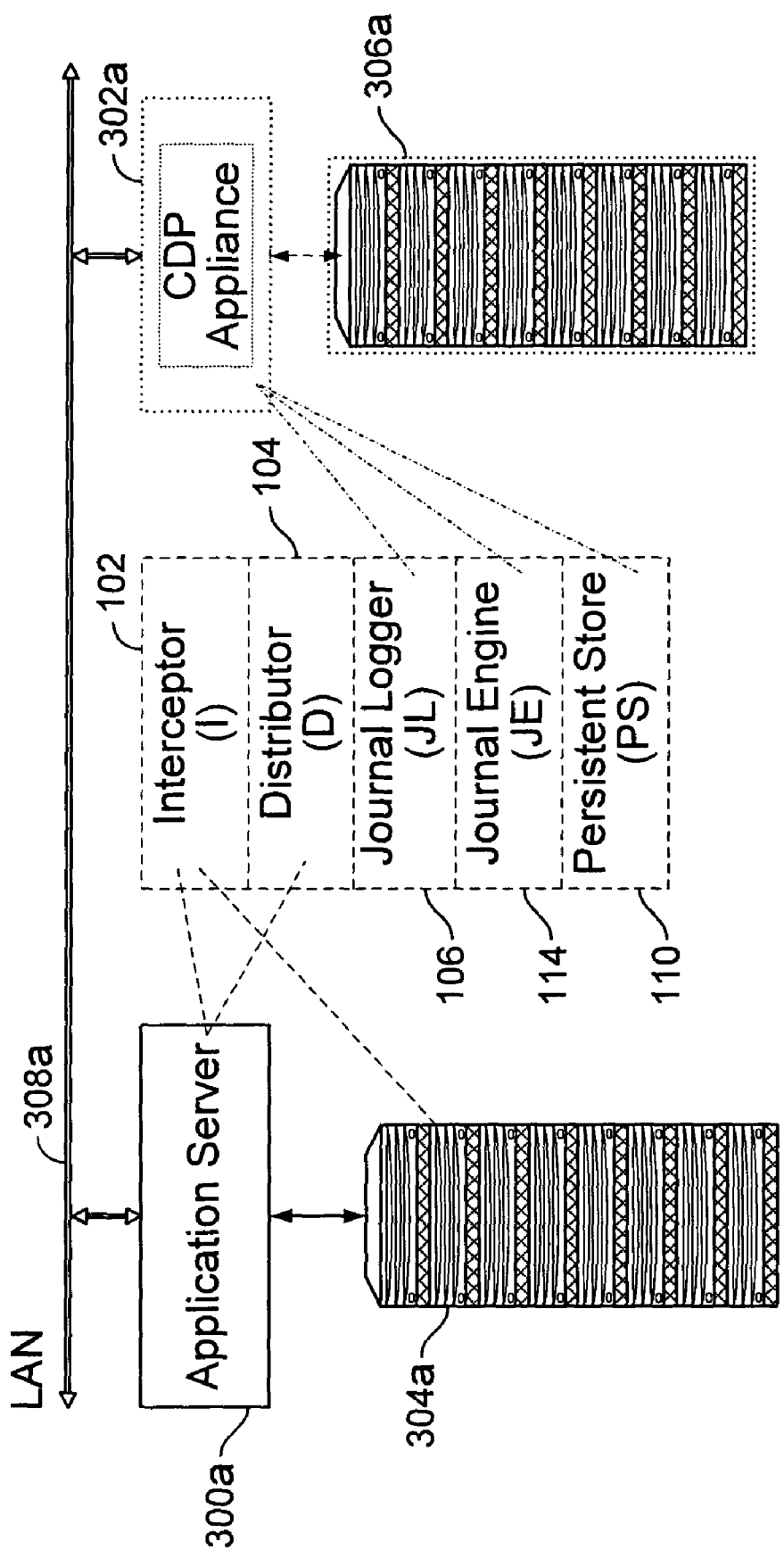
FIG. 4 is an illustration of a system for protecting and managing information in some embodiments.

FIG. 4 is an illustration of a system for protecting and managing information in some embodiments. In this example, an application server 300A is shown to be coupled with a LAN 308A. The application server is also shown to be coupled with a host storage system 304A. The LAN 308A is also shown to be coupled with a data protection appliance 302A. The data protection appliance 302A may be any processing machine capable of hosting at least one data protection component 102-110 of FIG. 4. The data protection appliance 302A is also shown to be coupled with a storage 306A. Storage 306A may be a protection vault that includes multiple storage devices.

In some embodiments, the interceptor 102 and distributor 104 may reside in the application server 300A. The journal logger 106, journal engine 114, and persistent store 110 may reside in the data protection appliance. Additionally, the virtual access interface 116 (of FIG. 1) and services and management console 118 (also of FIG. 1), may reside in the data protection appliance 302A.

In another example, the interceptor 102 may reside in the host storage system 304A.

Figure 5:
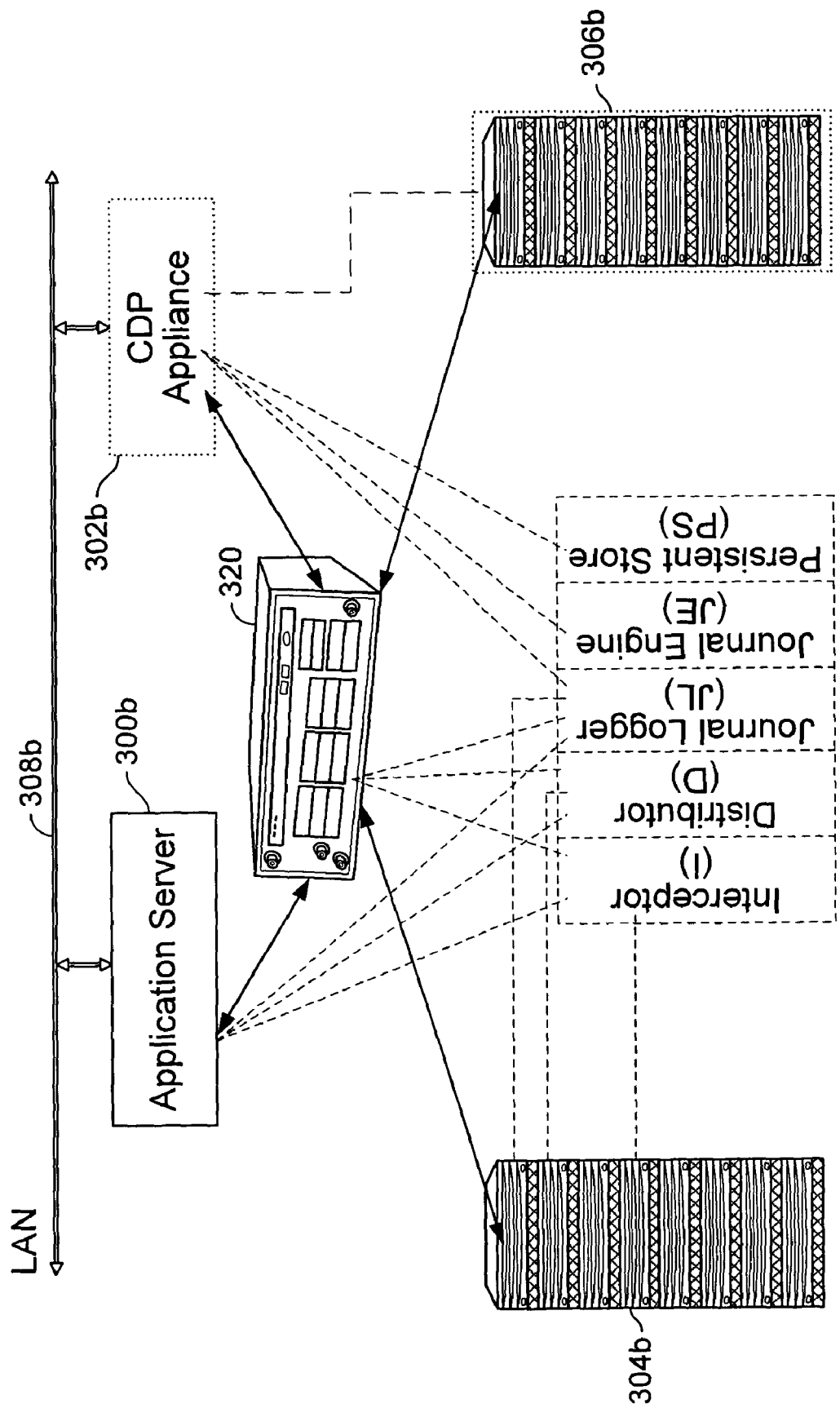
FIG. 5 is an illustration of a SAN or switch-based configuration used in some embodiments.

FIG. 5 is an illustration of a SAN or switch-based configuration used in some embodiments. In this example, the LAN 308B is shown to be coupled with an application server 300B and the data protection appliance 302B. The application server 300B and data protection appliance 302B are both shown to be coupled with a switch 320. The switch 320 is shown to be coupled with the storage system 304B and protection vault 306B. In one variation, the data protection appliance 302B may be directly coupled with the protection vault 306B.

In some embodiments, the interceptor 102, distributor 104, and journal logger 106 may reside in switch 320. The journal engine 114 and persistent store 110 may reside in the data protection appliance 302B.

In some embodiments, the interceptor 102, distributor 104, and journal logger 106 may reside in the storage system 304B. In some embodiments, the journal logger may reside in the data protection appliance 302B. In some embodiments, the interceptor 102, distributor 104, and journal logger 106 may reside in the application server 300B.

Figure 6:
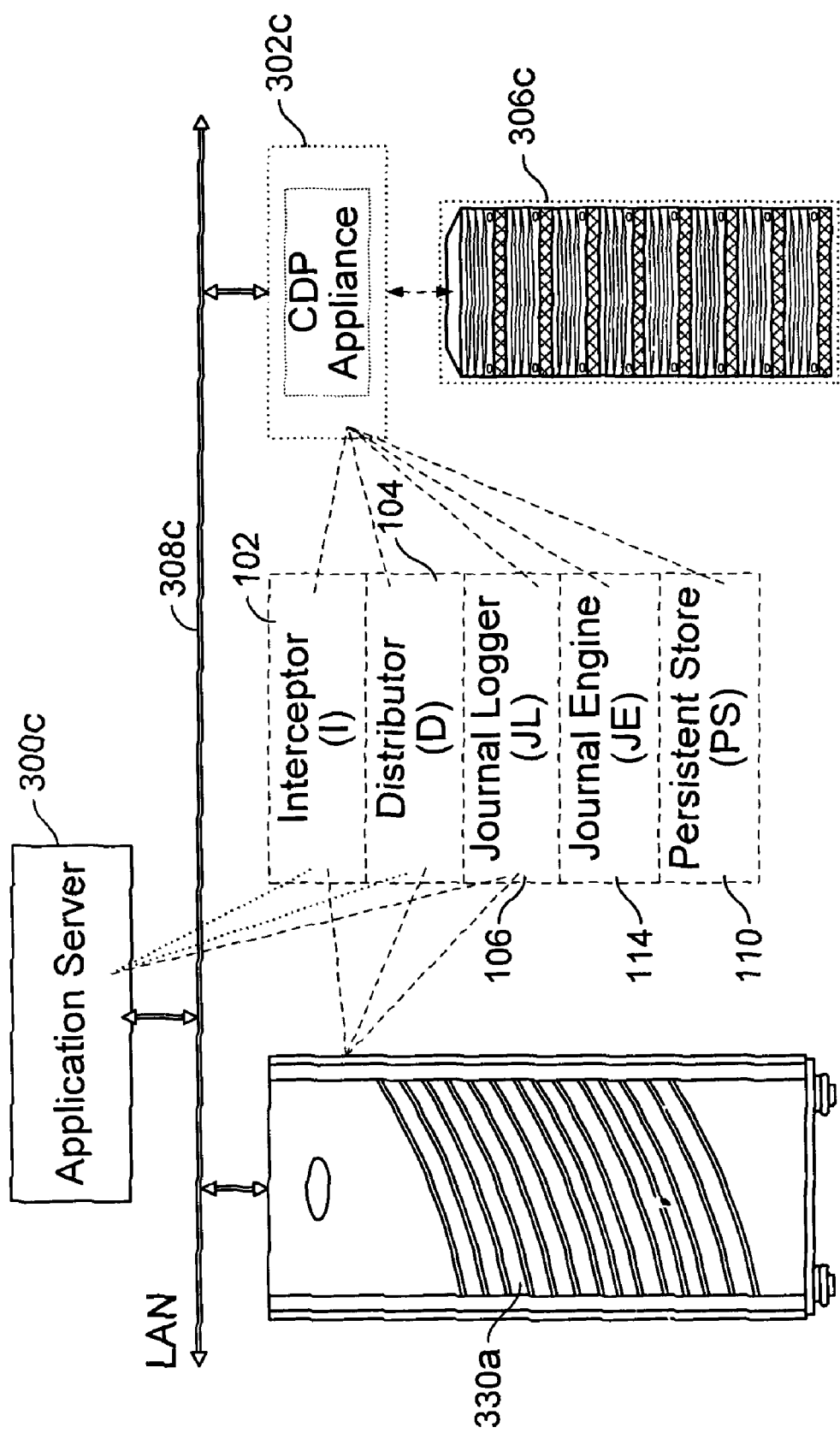
FIG. 6 shows another example of a system for information protection and management in some embodiments.

FIG. 6 shows another example of a system for information protection and management in some embodiments. In this example, the application server 300C is shown to be coupled with the LAN 308C, which in turn is shown to be coupled with the network attached storage 330A and the data protection appliance 302C. The data protection appliance 302C is shown to be coupled with protection vault 306C.

In some embodiments, the interceptor 102, distributor 104, journal logger 106, journal engine 114 and persistent store 110 may also reside in the data protection appliance 302C. In other embodiments, the interceptor 102 and distributor 104 may reside in the application server 300C while the journal logger 106, journal engine 114 and persistent store 110 reside in the data protection appliance 302C. In other embodiments, the interceptor 102, distributor 104, and journal logger 106 may reside in the network attached storage 330A, while the journal engine 114 and persistent store 110 reside in the data protection appliance 302C. In yet other embodiments, the interceptor 102, distributor 104 and journal logger 106 may reside in the application server 300C. In yet other embodiments, a switch (not shown) may also be coupled with the LAN 308C and the switch may have the interceptor 102 and distributor 104 residing in it.

Figure 7:
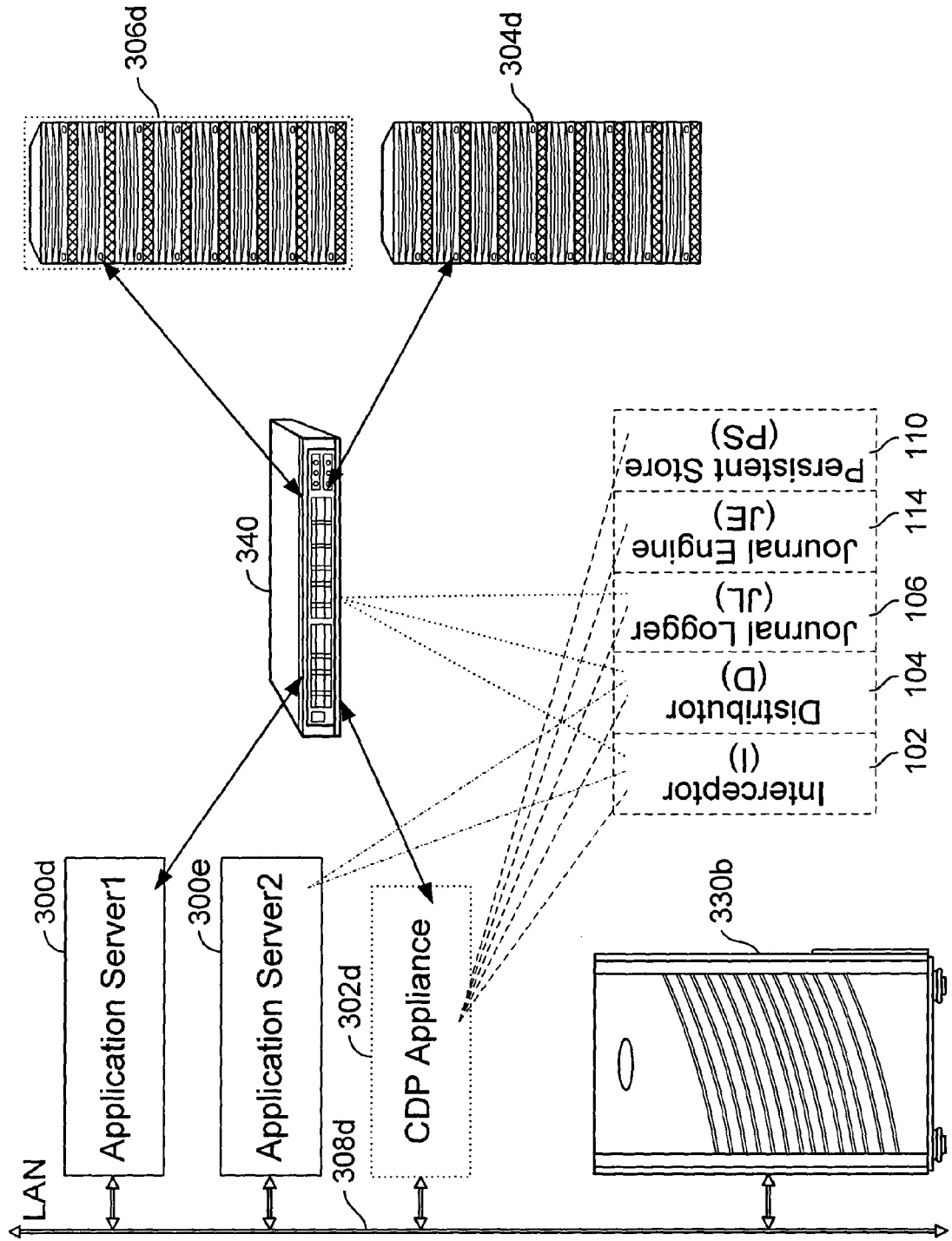
FIG. 7 shows another example of a system for information protection and management in some embodiments.

FIG. 7 shows another example of a system for information protection and management in some embodiments. In this example, the LAN 308D is shown to be coupled with multiple application servers 300D-300E as well as the data protection appliance 302D and the network attached storage 330B. The application server 300D and data protection appliance 302D are shown to be coupled with a switch 340 which in turn is shown to be coupled with storage 306D and 304D.

In some embodiments, all of the protection components 102-114 may reside in the data protection appliance 302D. In other embodiments, the interceptor 102 and distributor 104 may reside in one of the application servers 300D-E. In other embodiments, the interceptor 102, distributor 104 and journal logger 106 may reside in the switch 340. In yet other embodiments, a LAN switch (not shown) may be coupled with the LAN 308D and the interceptor 102 and distributor 104 may reside in the LAN switch.

The systems described in FIGS. 4-7 are merely examples of possible configurations. Other configurations are contemplated in other embodiments, including any combination of protection components 102-114 residing in any combination of devices.

Figure 8A:
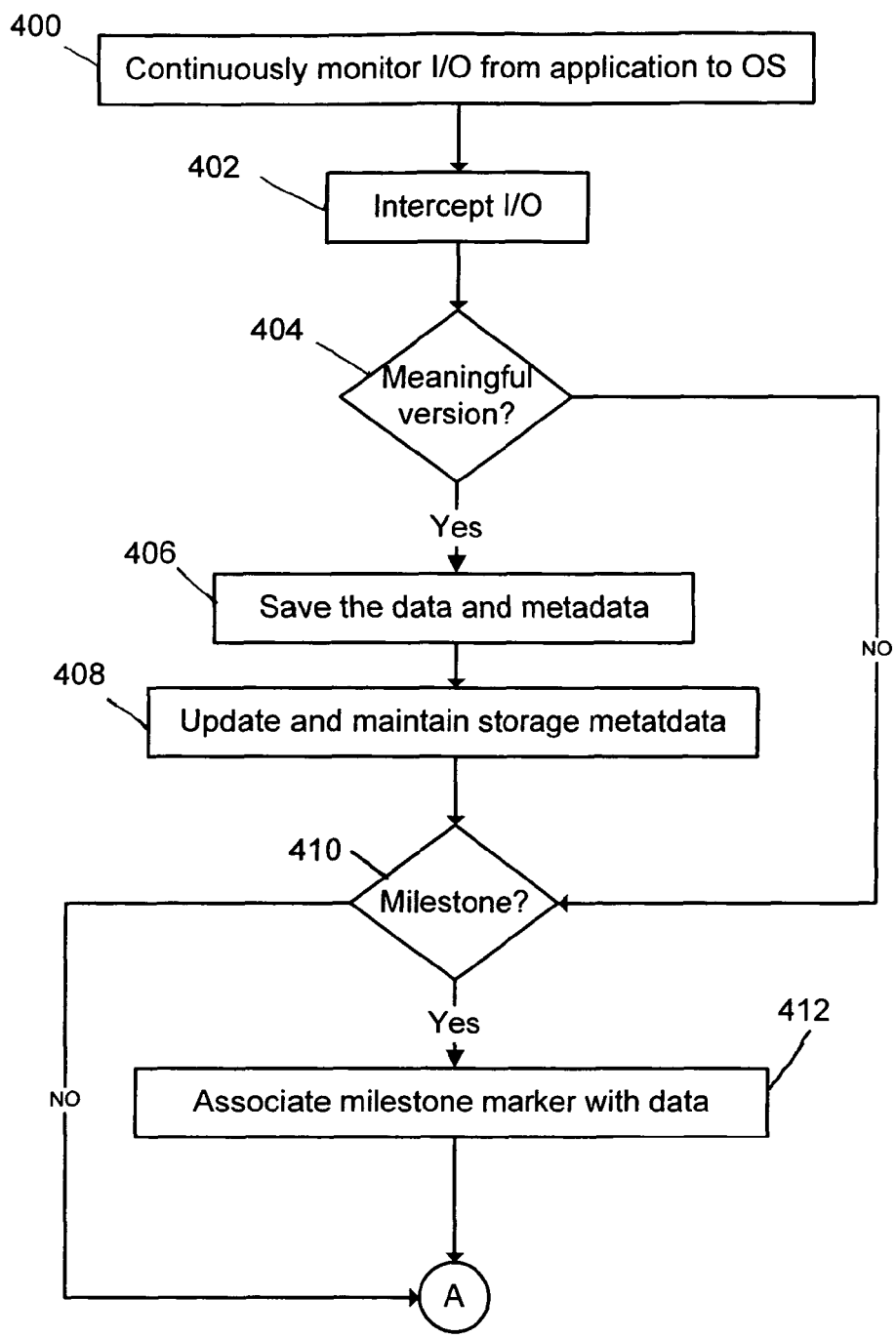
FIGS. 8A-8C are flow diagrams of a method for protecting and managing information in some embodiments.
Figure 8B:
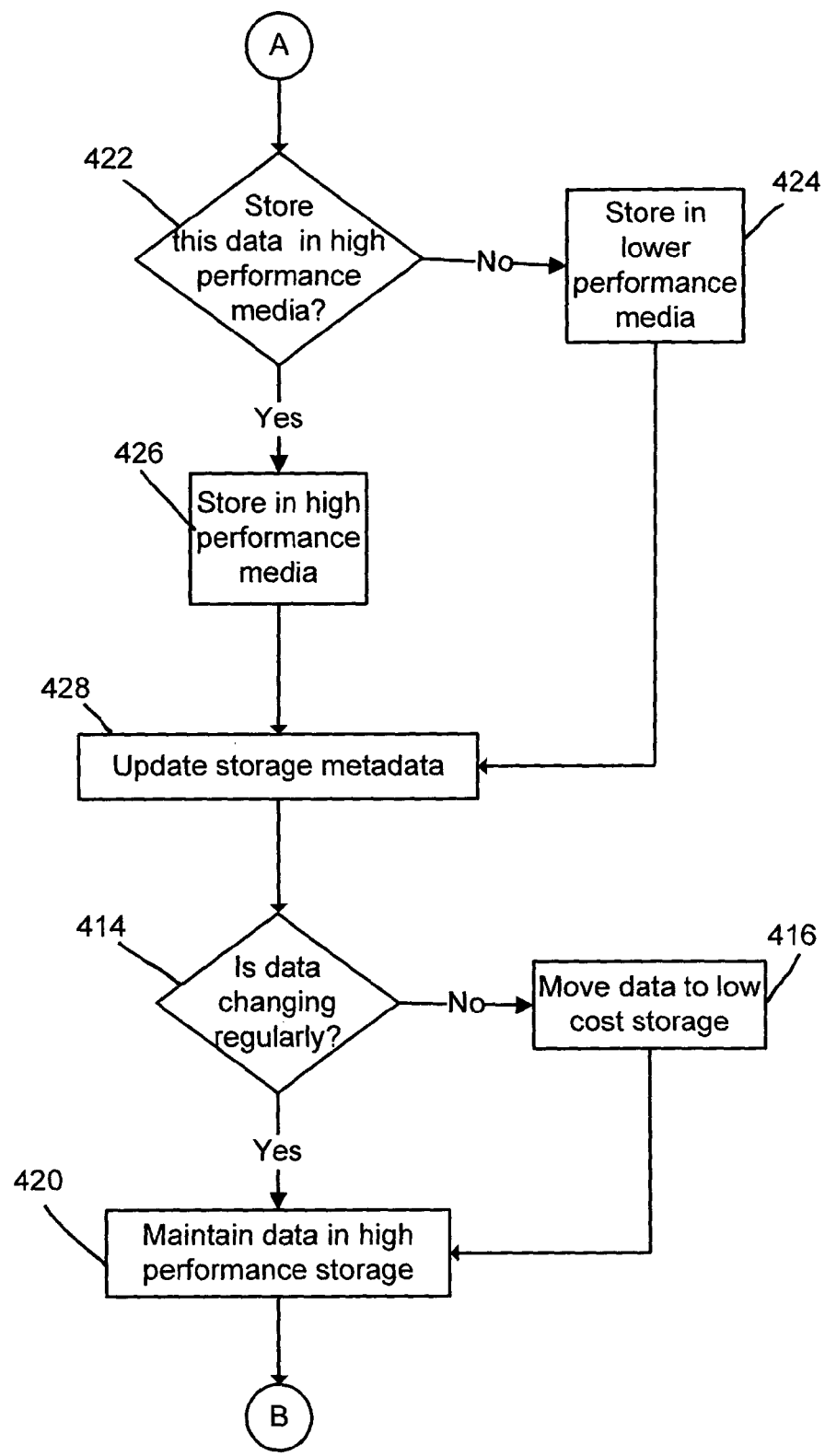
Figure 8C:
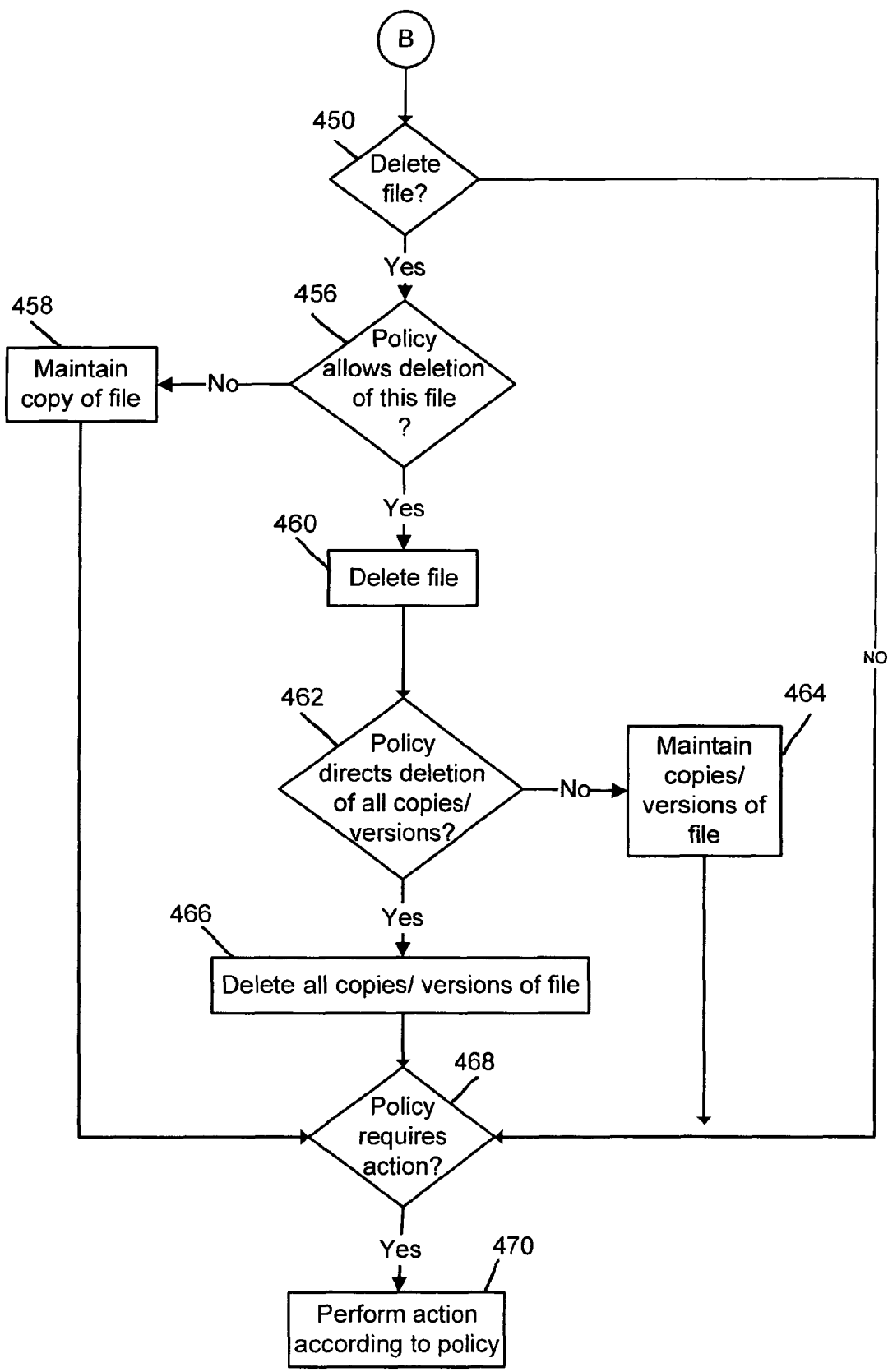

FIGS. 8A-8C are flow diagrams of a method for protecting and managing information in some embodiments. In this example, input/output (I/O) is continuously monitored from the application to the operating system 400. The I/O is intercepted 402. For example, if drive D is to be continuously monitored, then I/O from the applications in drive D to the operating system are intercepted. Likewise, if a particular file is to be monitored, then the I/O associated with that file is continuously monitored and intercepted.

In some embodiments, it is determined whether a meaningful version has been created 404. For example, if a user is working on a word document, then the changes to that word document may be continuously monitored and intercepted. It is determined whether this particular change to the document is a meaningful version. An example of a meaningful version is when a user makes changes, saves the changes, and closes the document.

If it is determined that this is a meaningful version 404, then the data and metadata are saved 406. Metadata as used herein refers to information related to the data. Examples of metadata include the time the data was created, who created it, what application it is associated with, etc. The storage metadata is then updated and maintained 408. Storage metadata as used herein refers to information related to data that is stored. Examples of storage metadata include the storage location of the data, how many copies of this particular data has been stored, how many versions of this document or file has been stored, etc.

It may also be determined whether this intercepted I/O is a milestone 410. A milestone, as used herein, refers to significant events of information such as creation of a file, deletion of a file, and a good point for performing a backup. If it is a milestone event 410, then a milestone marker is associated with the data 412.

It may also be determined whether to store in high performance media 422. For example, a particular file may be designated as being important enough to always store in high performance media or certain types of documents, such as PowerPoint Presentations, may be designated to always be stored in lower performance media. Accordingly, if it is determined that this data should not be stored in high performance media 422, then it is stored in the lower performance media 424. If, however, it is determined that it should be stored in high performance media, then it is stored in high performance media 426. The storage metadata is then updated 428 to indicate the location of the data in the storage media.

It may also be determined as to whether the data is changing regularly 414. The level of regular or frequent changes can be configured as a policy to determine at what level of usage a file should be stored in a lower performance, low cost storage. If data is not changing regularly, then it may be moved to a low cost, low performance storage 416. If, however, data is changing regularly 414, then the data is maintained in the high performance storage 420.

It may also be determined whether a file is being deleted 450. If the intercepted I/O is for deleting a file, then it is determined whether the policy allows the deletion of this file

456. If the predetermined policy does not allow the deletion of this file, then a copy of the file is maintained 458. For example, an enterprise policy or an SEC policy might require that all financial documents be saved for a certain number of years. If the file that the user is attempting to delete is a financial document, then depending on the policy, the file may be deleted in the user's computer but a copy of the file may be maintained in low performance archival storage.

If policy does allow deletion of this file 456, then the file is deleted 460. It may also be determined whether the policy directs the deletion of all copies and versions of the file when the file is deleted on the user's machine 462. If the policy does not direct the deletion of all copies and versions, then copies and versions of the file are maintained 464. If, however, the policy directs deletion of all copies and versions 462, then all copies and versions of the file are deleted 466. For example, if a Power Point presentation is deleted by a user, and there are ten saved versions of that presentation, then all ten saved versions will be deleted when the user deletes the current presentation.

It may also be determined whether the policy requires a particular action 468, in which case, the action may be performed according to policy 470. For example, a company may have a policy to save all emails in a specific email repository. In that example, it would be determined whether the intercepted I/O is related to an email and if so it would be saved in the specified email repository.

Figure 9:
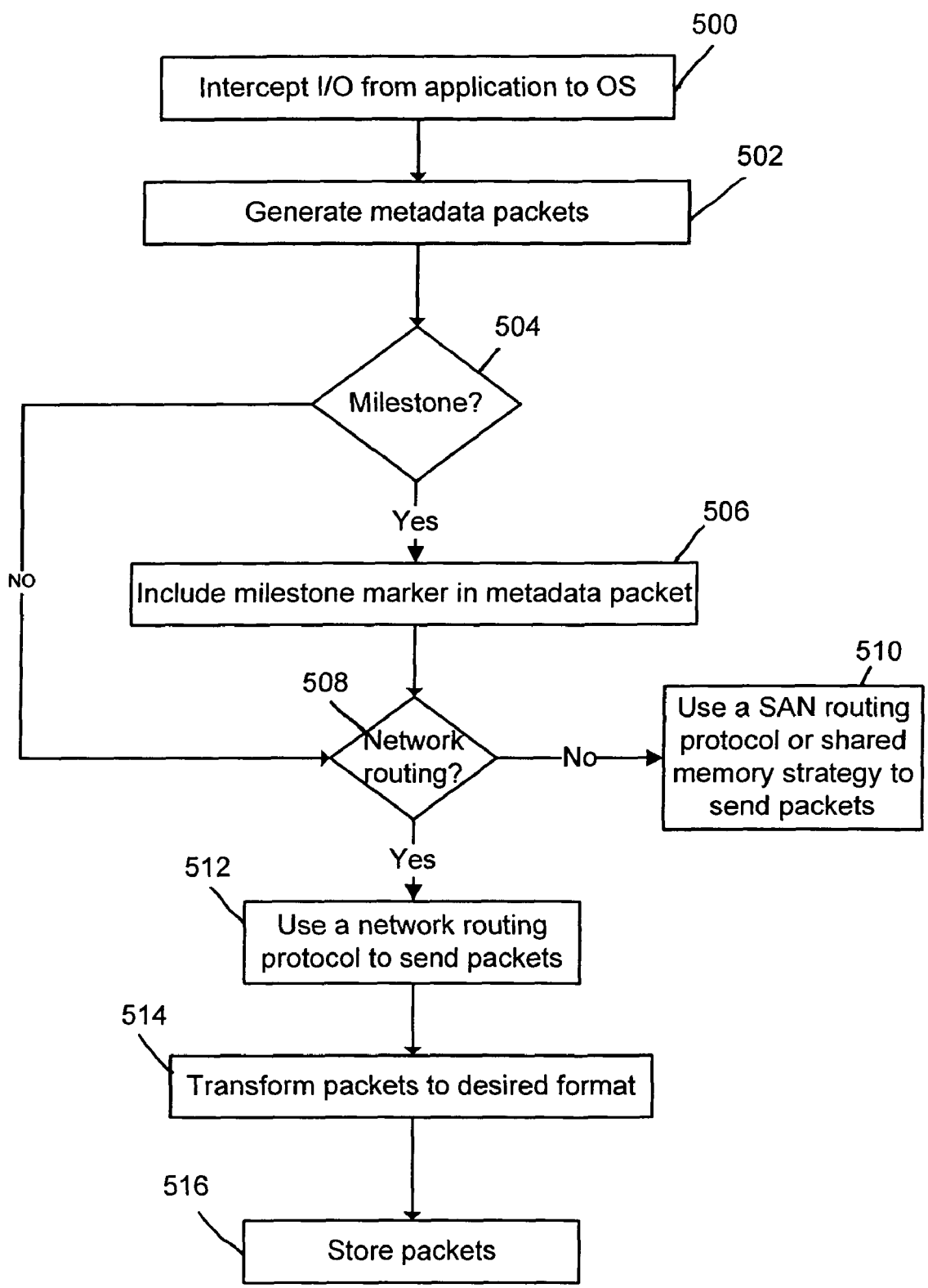
FIG. 9 is a flow diagram of a method for intercepting and storing information in some embodiments.

FIG. 9 is a flow diagram of a method for intercepting and storing information in some embodiments. In this example, I/O is intercepted from the applications to the operating system 500. Metadata packets are generated 502. Examples of metadata include the time that a change occurred, which application it occurred in, and which computer system it occurred in. It is determined whether this event is a milestone 504. If it is a milestone, then a milestone marker is included in the metadata packet 506.

It is also determined whether the data and metadata packets should be sent via a network routing protocol 508. If it should not be sent via a network routing protocol, then a SAN routing protocol or Shared Memory strategy is used to send the packets in this example 510. If, however, a network routing protocol should be used 508, then network routing protocol is used to send the packets 512. In some embodiments, the packets are sent to the journal logger, such as journal logger 106 of FIG. 1.

The packets may be transformed to desired format 514. For example, the packets may be transformed into XML and sent to the storage media in an FC packet format. The packets are then stored 516.

Figure 10:
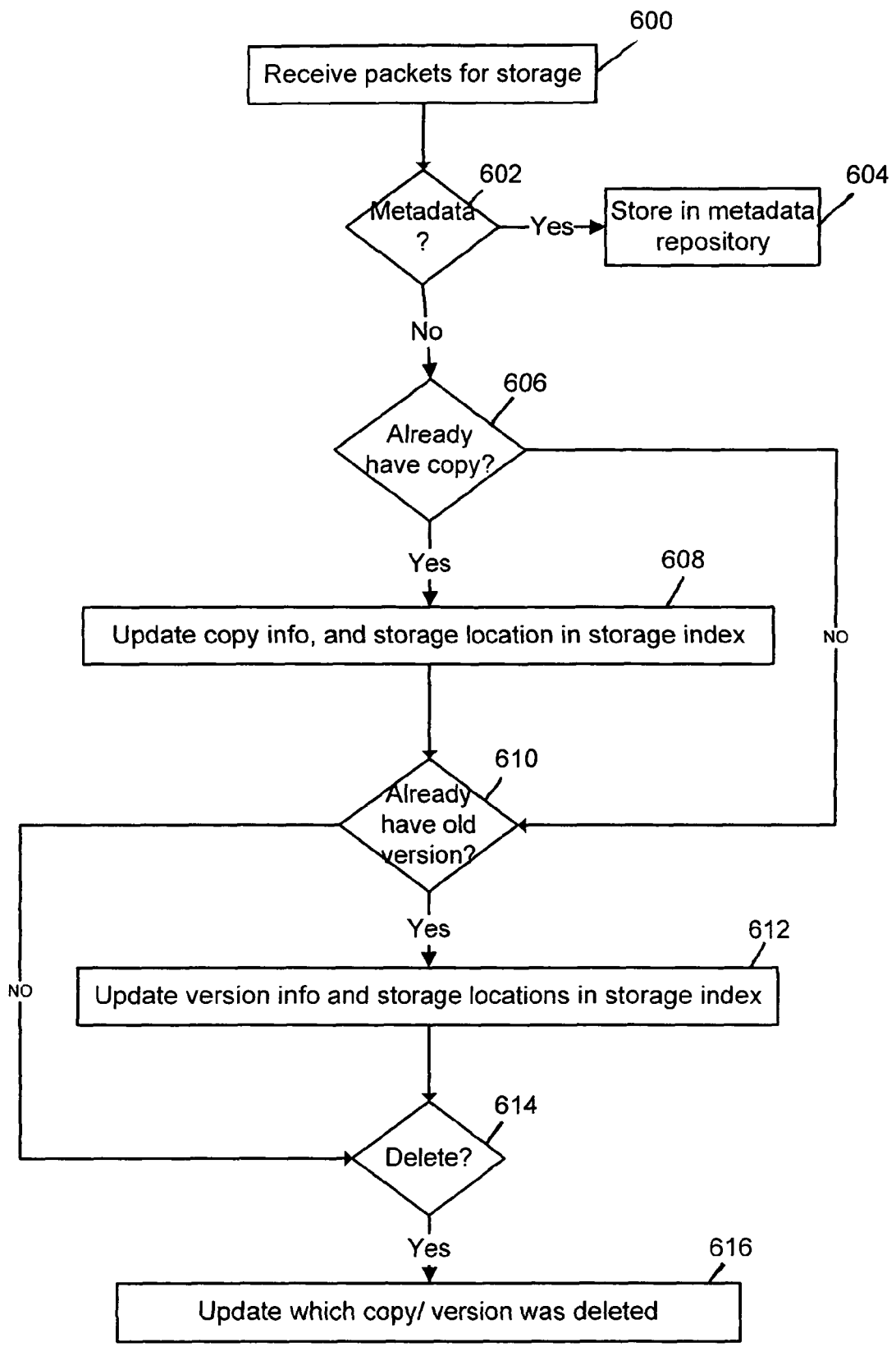
FIG. 10 is a flow diagram of a method for storage indexing in some embodiments.

FIG. 10 is a flow diagram of a method for storage indexing in some embodiments. In this example, data packets are received for storage 600. It is determined whether these packets are metadata 602. If the packets are metadata 602, then the packets are stored in the metadata repository 604. If the packets are not metadata 602, then it is determined whether there is already a copy of this file 606. A file, as used herein, refers to any group of data, such as a file, a document, an Excel spreadsheet, a database, or a file system or directory.

It is then determined whether there is already a copy of this data 606. If there is already a copy stored in the storage media 606, then copy information and storage location are updated in the storage index 608. In some embodiments, a storage index is maintained which includes information such as how many copies of a file are stored, how many versions of a file are stored, and the storage locations of each of these copies and versions.

It may also be determined whether there is an old version of this data 610. If there is an old version, then version information and storage locations of the various versions are updated in the storage index 612.

It may also be determined whether these received packets indicate that a file is being deleted 614. If it is being deleted, then the storage index is updated with which copy or version is being deleted 616.

In some embodiments, keeping track of this type of information facilitates answering queries related to the stored data as well as assisting in SEC compliance or enterprise policy compliance.

Figure 11A:
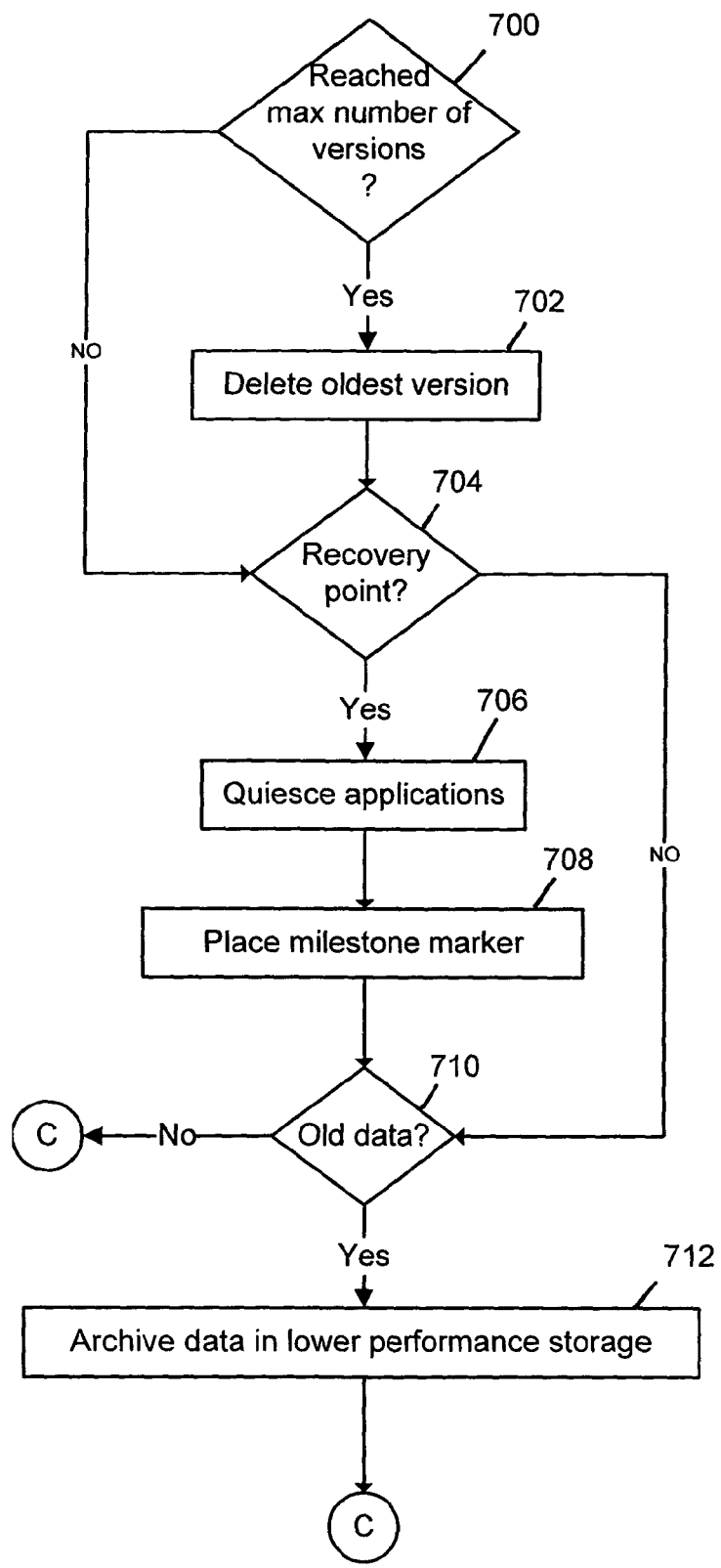
FIGS. 11A-11B are flow diagrams of a method executed by a journal engine in some embodiments.
Figure 11B:
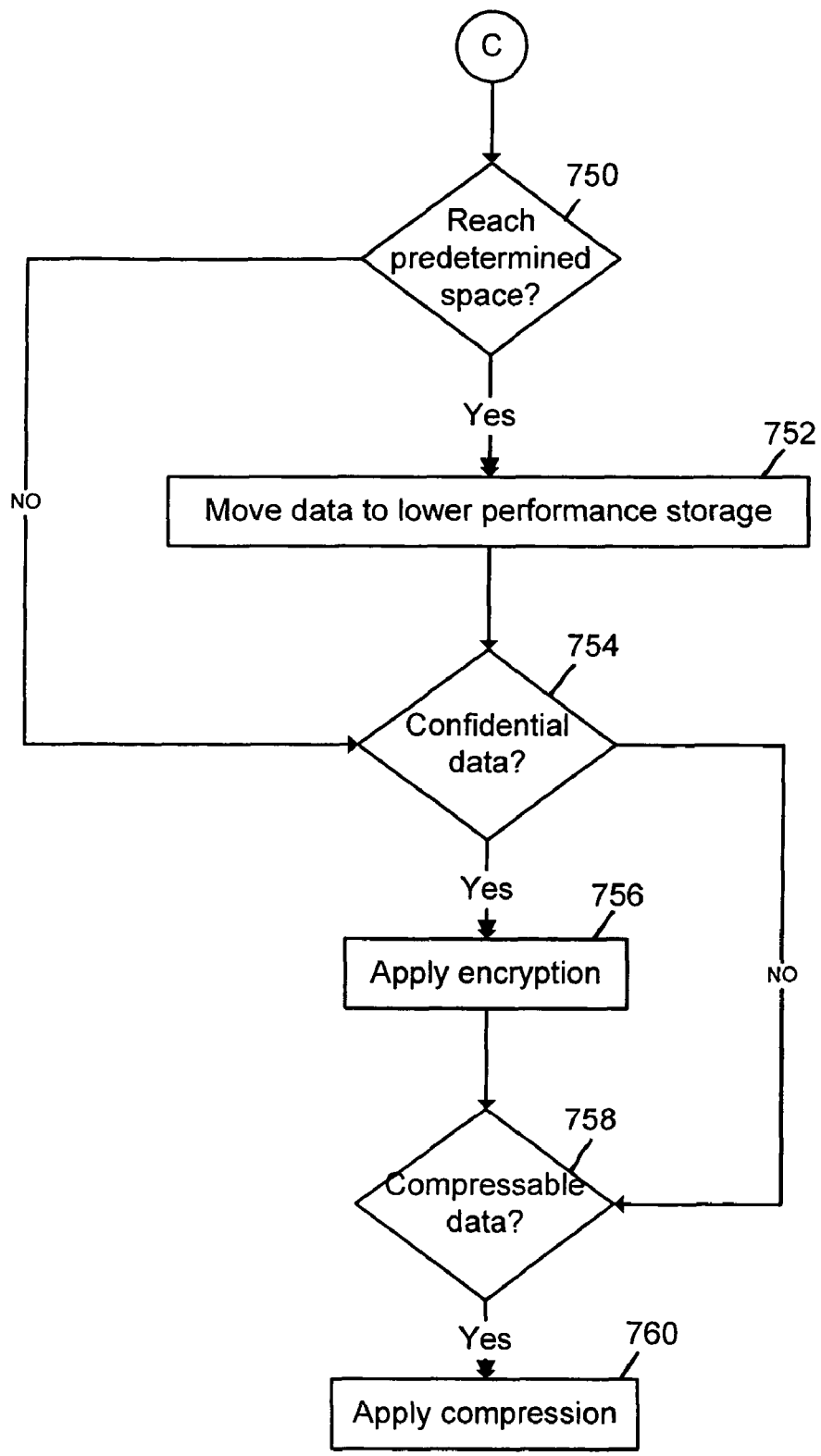

FIGS. 11A-11B are flow diagrams of a method executed by a journal engine in some embodiments. In this example, it is determined whether a maximum number of versions has been reached 700. For example, a policy may dictate that up to ten versions of a document can be saved. If the maximum number of versions has been reached, then the oldest version is deleted in this example 702.

It may also be determined whether this particular situation is a good recovery point 704. One example of a good recovery point is when all or most the applications are not active or in a quiescent state, such as the middle of the night when very few changes are occurring in the system. Another example of a recovery point is a scheduled recovery point such as scheduling a recovery point every two hours.

In some embodiments, if this situation is a recovery point 704, then the applications may be made quiescent 706. When applications are made quiescent, the I/Os are held during this time in order to obtain a clean point at which a backup can be made. In some embodiments, a backup is not made at this time. The applications are made quiescent and a backup milestone marker is placed 708. Since an actual backup is not performed in some embodiments, the quiescing of the applications and placing of the backup milestone marker can be performed quickly and efficiently.

It may also be determined whether specific stored data is old 710. The age at which data is deemed old can be specified in a policy. For example, data that is one week old may be determined to be old. If the data is old, then it may be archived in a lower performance storage 712.

It may also be determined whether data in the persistent store has reached a predetermined amount of space 750. If the stored data has filled a predetermined amount of space, then data may be moved to a lower performance storage 752, in some embodiments. In some embodiments, the data that is moved to a lower performance storage may be prioritized so that certain types of data are moved to the lower performance storage before other types of data. For example, PowerPoint Presentations may be moved to lower performance storage before emails are moved, which in turn, might be moved to lower performance storage before Word documents.

It may also be determined whether stored data is confidential 754. If data is confidential then encryption may be applied to such data 756.

It may also be determined whether the stored data is compressible 758. If certain data are compressible, then compression may be applied to such data 760.

Figure 12:
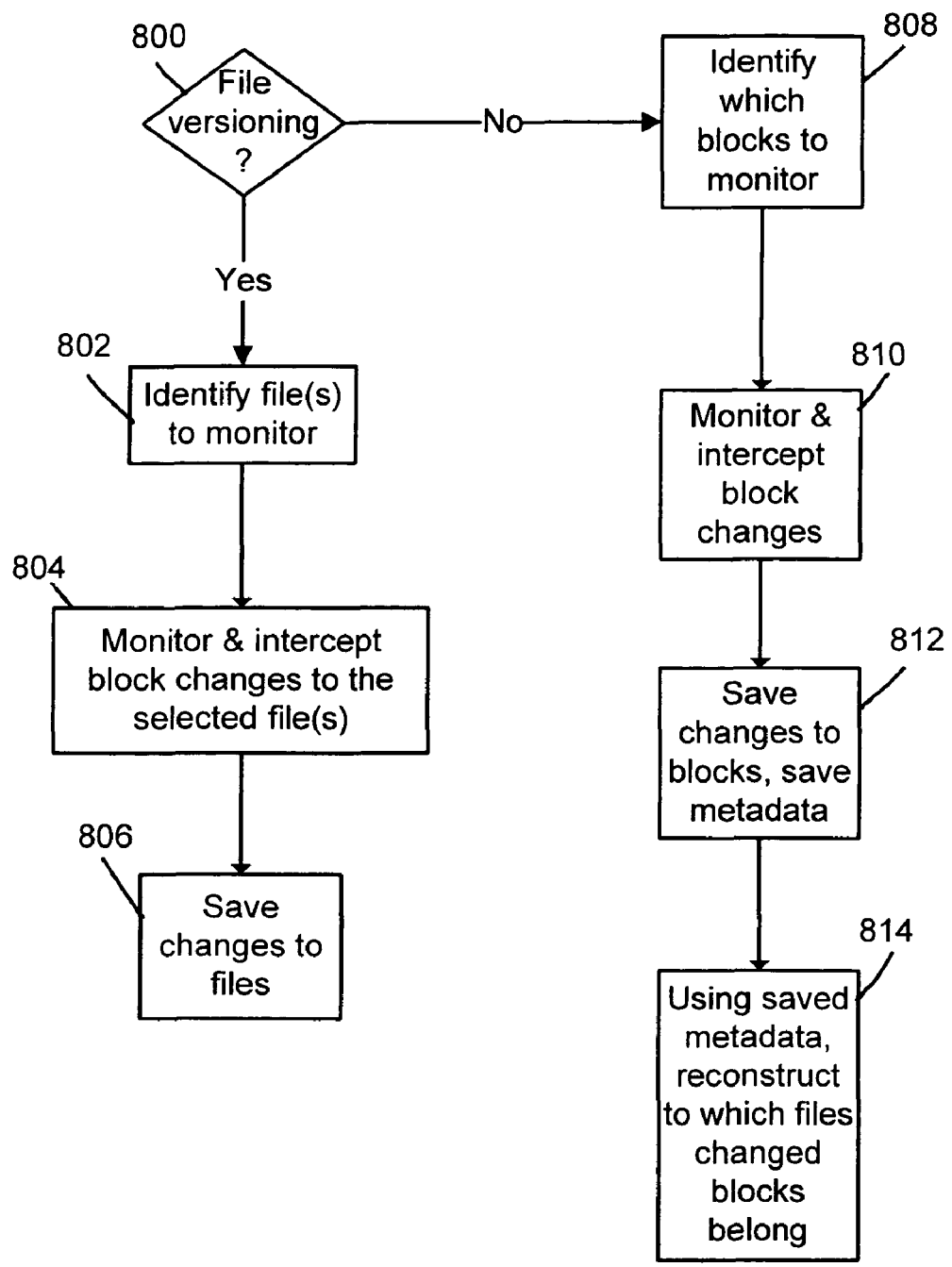
FIG. 12 is a flow diagram for a method of block and file versioning in some embodiments.

FIG. 12 is a flow diagram for a method of block and file versioning in some embodiments. In this example, it is determined whether to perform file versioning 800. If file versioning should occur then files to monitor are identified 802. For example, an entire file system may be designated to be monitored, or a particular file or group of files may be identified to be monitored. Block changes to the selected files are then monitored and intercepted 804. These changes are then saved such that the changes are associated with the file to which the change has been made.

If it is determined that file versioning should not occur 800, then the blocks of data to be monitored are identified 808. In some embodiments the data blocks to be monitored are independent of the files to which the data is associated. Changes to these blocks are then monitored and intercepted 810. The changes to these blocks are saved, and the metadata associated with these changes are also updated 812. Examples of the metadata associated with the changed blocks include which file the data blocks are associated with. Using the saved metadata, the files to which the saved blocks belong may be reconstructed 814.

Accordingly, both block and file versioning may be performed. This can be configured as part of setup by choosing appropriate strategy of using File or Block or combination of both.

Figure 13:
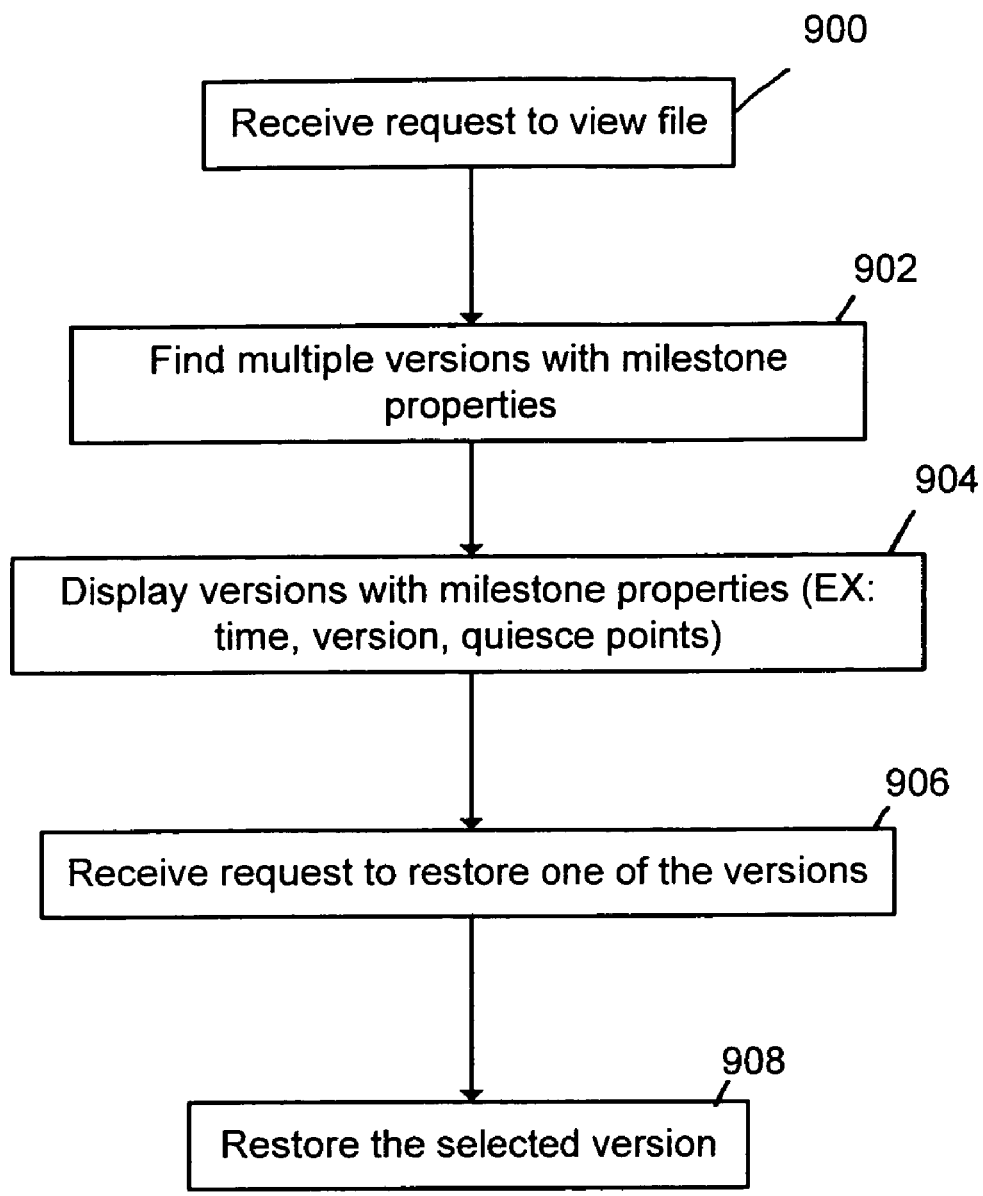
FIG. 13 is a flow diagram of a method for recovery of stored data in some embodiments.

FIG. 13 is a flow diagram of a method for recovery of stored data in some embodiments. In this example, a request to view a file is received 900. For example, a request to view a file named D:/A.Text may be received. Multiple versions with milestone properties may be found 902. For example, a search may be conducted in the persistent store, such as the persistent storage 110 of FIG. 1, for multiple versions of the requested file. The milestone properties associated with those versions are also found. Examples of the milestone properties include date and time of the versions.

These versions may be displayed with their milestone properties 904. Accordingly, the user may view a list of versions with the time, the version, and quiescent points indicating that this particular version is a backup quality version. A request to restore one of the versions may then be received 906 and the selected version is then restored 908.

Figure 14:
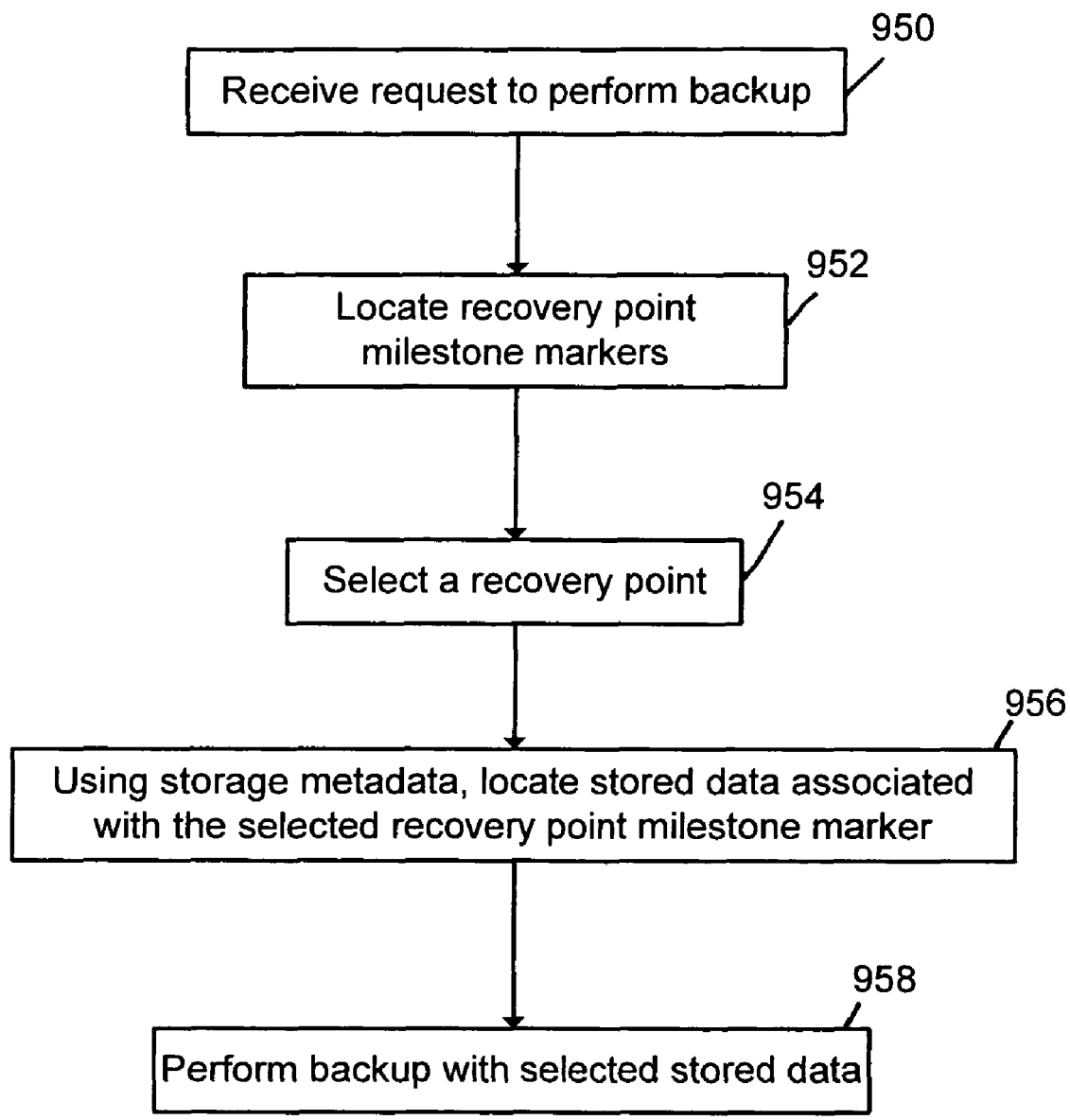
FIG. 14 is a flow diagram of a method for backing up data in some embodiments.

FIG. 14 is a flow diagram of a method for backing up data in some embodiments. In this example, a request to perform a backup is received. Recovery point milestone markers are then located 952. A recovery point is then selected 954. For example, versions with recovery point milestone markers may be located and displayed to a user and a user may select a recovery point to backup. Alternatively, backups may be scheduled so that versions from a particular time are automatically selected 954.

Using the storage metadata, the stored data associated with the selected recovery point milestone marker is located 956. For example, the storage metadata may indicate where the selected data is stored. Backup is then performed with the selected stored data in this example 958. In some embodiments, the backups are performed with the stored data, allowing the applications to perform at normal performance levels.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for information management comprising:
    intercepting output from an application by continuously monitoring input/output (I/O) as the I/O traverses from the application to an operating system but prior to arrival at the operating system in order to trap file I/O before information is written to storage without modification to the operating system, wherein the output is directed towards protected data;
    using a processor to analyze the intercepted output to determine whether a predetermined type of version of the protected data has been created;
    in the event it is determined that the predetermined type of version of the protected data has been created at least in part because the analyzed intercepted output includes a save and a close, automatically backing up the protected data, including by storing at least some of the intercepted output as a backup version of the protected data, wherein the version backed up is the predetermined type of version; and
    not backing up the protected data in the event it is determined that the predetermined type of version of the protected data has not been created.

2. The method of claim 1, further comprising updating a storage metadata.

3. The method of claim 1, wherein data is saved in a medium external to a device on which the application resides.

4. The method of claim 1, further comprising determining whether the output is associated with a milestone, wherein a milestone includes at least one of the following: creating a file, deleting a file, or a scheduled backup event.

5. The method of claim 4, wherein the milestone is a candidate for a backup.

6. The method of claim 4 further comprising:
    storing a milestone marker and time and/or date information in the event it is determined the output is associated with a milestone; and
    in the event a request associated with recovering the protected data is received:
        locating one or more stored milestone markers; and
        presenting the stored time and/or date information for the located milestone markers.

7. The method of claim 1 further comprising using the processor to determine, based at least in part on the intercepted output, if the intercepted output is associated with an instruction for deleting a file.

8. The method of claim 7 further comprising:
    determining whether a policy permits deletion of the file if the intercepted output is associated with an instruction for deleting a file; and
    saving at least one copy or version of the file if it is determined that the policy does not permit deletion of the file.

9. A system for information management comprising:
    a processor configured to:
        intercept output from an application by continuously monitoring input/output (I/O) as the I/O traverses from the application to an operating system but prior to arrival at the operating system in order to trap file I/O before information is written to storage without modification to the operating system, wherein the output is directed towards protected data;
        analyze the intercepted output to determine whether a predetermined type of version of the protected data has been created;
        in the event it is determined that the predetermined type of version of the protected data has been created at least in part because the analyzed intercepted output includes a save and a close, automatically back up the protected data, including by storing at least some of the intercepted output as a backup version of the protected data, wherein the version backed up is the predetermined type of version; and
        not back up the protected data in the event it is determined that the predetermined type of version of the protected data has not been created; and
    a memory coupled to the processor and configured to provide the processor with instructions.

10. The system of claim 9, wherein the memory is one or more of the following: remote from the processor, local to the processor, or coupled to the processor via a LAN.

11. The system of claim 9, wherein the processor is further configured to determine whether the output is associated with a milestone, wherein a milestone includes at least one of the following: creating a file, deleting a file, or a scheduled backup event.

12. The system of claim 11, wherein the milestone is a candidate for a backup.

13. The system of claim 11, wherein:
the memory is further configured to store a milestone marker and time and/or date information in the event it is determined the output is associated with a milestone; and
in the event a request associated with recovering the protected data is received, the processor is further configured to:
locating one or more stored milestone markers; and
presenting the stored time and/or date information for the located milestone markers.

14. The system of claim 9, wherein the processor is further configured to determine, based at least in part on the intercepted output, if the intercepted output is associated with an instruction for deleting a file.

15. The system of claim 14, wherein the processor is further configured to:
determine whether a policy permits deletion of the file if the intercepted output is associated with an instruction for deleting a file; and
save at least one copy or version of the file if it is determined that the policy does not permit deletion of the file.

16. A computer program product for information management, the computer program product being embodied in a computer readable storage medium and comprising computer instructions for:
intercepting output from an application by continuously monitoring input/output (I/O) as the I/O traverses from the application to an operating system but prior to arrival at the operating system in order to trap file I/O before information is written to storage without modification to the operating system, wherein the output is directed towards protected data;
analyzing the intercepted output to determine whether a predetermined type of version of the protected data has been created;
in the event it is determined that the predetermined type of version of the protected data has been created at least in part because the analyzed intercepted output includes a save and a close, automatically backing up the protected data, including by storing on the second device at least some of the intercepted output as a backup version of the protected data, wherein the version backed up is the predetermined type of version; and
not backing up the protected data in the event it is determined that the predetermined type of version of the protected data has not been created.

17. The computer program product of claim 16, further comprising computer instructions for determining whether the output is associated with a milestone, wherein a milestone includes at least one of the following: creating a file, deleting a file, or a scheduled backup event.

18. The computer program product of claim 17, wherein the milestone is a candidate for a backup.

19. The computer program product of claim 17 further comprising computer instructions for:
storing a milestone marker and time and/or date information in the event it is determined the output is associated with a milestone; and
in the event a request associated with recovering the protected data is received:
locating one or more stored milestone markers; and
presenting the stored time and/or date information for the located milestone markers.

20. The computer program product of claim 16 further comprising computer instructions for determining, based at least in part on the intercepted output, if the intercepted output is associated with an instruction for deleting a file.

21. The computer program product of claim 20 further comprising computer instructions for:
determining whether a policy permits deletion of the file if the intercepted output is associated with an instruction for deleting a file; and
saving at least one copy or version of the file if it is determined that the policy does not permit deletion of the file.

* * * * *